United States Patent [19]
Lavancy et al.

[11] Patent Number: 5,314,270
[45] Date of Patent: May 24, 1994

[54] PLUNGE CUTTING DEVICE AND METHOD FOR PIPES

[76] Inventors: Wayne N. Lavancy, 5116 Peyton Place Ct., St. Louis, Mo. 63128; Darrell G. Stack, 3111C Broken Oak Dr., St. Louis, Mo. 63129

[21] Appl. No.: 52,521

[22] Filed: Apr. 29, 1993

Related U.S. Application Data

[63] Continuation-in-part of Ser. No. 854,586, Mar. 20, 1992.

[51] Int. Cl.⁵ .................................................. B23B 5/16
[52] U.S. Cl. .................................. 408/1 R; 408/196; 408/201; 408/204; 408/713; 82/113
[58] Field of Search ............... 82/113; 408/82, 113, 408/114, 196, 197, 200, 201, 203.5, 204, 206, 207, 225, 1 R, 1 BD, 713

[56] References Cited

U.S. PATENT DOCUMENTS

| | | |
|---|---|---|
| 3,636,803 | 1/1972 | Miller ............................. 82/113 |
| 3,817,649 | 6/1974 | Medney .......................... 408/211 |
| 3,999,452 | 12/1976 | Larsen ............................ 408/80 |
| 4,114,484 | 9/1978 | Feamster, III .................. 82/113 |
| 4,364,290 | 12/1982 | Astle ............................... 82/113 |
| 4,691,600 | 9/1987 | Carlson et al. ................. 408/80 |
| 4,693,643 | 9/1987 | Heyworth ....................... 408/201 |
| 4,930,948 | 6/1990 | Bowen ............................ 408/201 |

*Primary Examiner*—Steven C. Bishop
*Attorney, Agent, or Firm*—Leydig, Voit & Mayer

[57] ABSTRACT

A plunge cutting device for plastic pipe, pipe couplings, plastic flanges and other planar members includes a cylindrical body including slots formed therein, a pilot for guiding the cylindrical body, and cutters adjustably mounted in the slots. A canted relief is formed in the cylindrical body adjoining the leading wall of each slot to facilitate ejection of cut shavings. The pilot may comprise a main pilot and an auxiliary pilot detachably connected to the main pilot. The auxiliary pilot can be replaced with one of a different diameter in accordance with the dimensions of a pipe being processed with the device.

16 Claims, 6 Drawing Sheets

PLUNGE CUTTING DEVICE AND METHOD FOR PIPES

This application is a continuation-in-part of application Ser. No. 07/854,586, filed Mar. 23, 1992.

TECHNICAL FIELD

This invention relates to a novel plunge cutting device and method for removing unwanted material form pipes, pipe couplings, and the like. The invention further relates to a novel method for plunge cutting a pipe member. Although not limited to use with pipes or couplings of a specific type, it is particularly suitable for use with those made of plastic.

BACKGROUND OF THE INVENTION

Plastic pipe cutters as used for shaving, milling and cutting the leading end of pipes are well known. Cutters for removing the hub of a pipe coupling have also been described in the literature. Such devices are useful in repair and replacement situations where a plastic pipe must be conditioned to receive a new fitting. They are most useful in situations where access to the pipe is limited, e.g., the pipe is embedded in and projects from a wall in such a way that replacement or extension of the pipe is not readily accomplished.

U.S. Pat. No. 4,691,600 to Carlson discloses a pipe shaving tool with recessed disk cutters mounted on forwardly projecting lugs positioned about an elongated mandrel. The Carlson device is mountable on a power drill or the like, and used exclusively for shaving the outer surface of a pipe to both a predetermined depth and length. The Carlson device has limited application, first because the cutters are recessed and secondly because the cutter position is not adjustable. Therefore, if the pipe or hub is too large to fit between the radiused gap defined by the lugs and the mandrel, the cutters can not access the hub. Furthermore, the Carlson device is not able to shave or cut a planar flange member or mounting fixture which is attached to the pipe. It is first necessary to cut the mounting fixture off the pipe end, for example, with a saw. Accordingly, the Carlson tool has limited applicability.

Another example of a pipe planing device is found in U.S. Pat. No. 4,693,643 to Heyworth. Heyworth describes a device for progressive planing of the interior of a plastic pipe which features a cylindrical pilot member, a shaft, and a rotatable hub. The rotatable hub includes circumferentially spaced and radially projecting spider arms on the end of which square cutters are recessed and fixedly secured. The cutters are fixed at a negative rake angle and their outer edges extend radially outward beyond the hub. The outer cutter edges are positioned on a radius to be flush with the inner diameter of a pipe. As in the case of other prior art reaming devices, Heyworth requires that the pipe be cut transversely before planing. Furthermore, the Heyworth tool is unable to remove members from the outside of a pipe.

Bowen, in U.S. Pat. No. 4,930,948, describes a specialized tool for valve seat refitting, the purpose being to simultaneously cut the three faces of a valve seat. To achieve this purpose, Bowen uses a rotary driven, cylindrical body portion with longitudinal, tangential slots to support adjustably mounted, variably positioned cutting blades. The blades project forwardly of the body in different orientations and at different lengths to cut all three faces of the valve seat for refitting.

The known devices possess general utility to remove hubs, sawed-off pipe joints, and the like, or specialized utility, e.g., to refit a valve seat. However, the known devices do not address or solve the problem associated with removal of mounted flanged pipe couplings or removal of fixtures having a diameter substantially greater than the diameter of the pipe. The prior art discloses pipe shaving devices for general use which require the cutters either to travel in a circular path moving inwardly from the outer diameter to the inner diameter of the pipe or to abut an pilot/guide during the cutting/reaming operation to maintain the cutters in a proper position.

Furthermore, during cutting operations with the prior art devices, the plastic shavings can accumulate in front of the device or cutter edges, resulting in non-uniform cutting. Some devices, such as those identified above, incorporate the cutters on projecting arms or spiders so that during the cutting operation the pipe shavings do not compress in front of the cutters but move into the gaps between the arms and may fall away from the device by gravity if the device is used in an open area. This method of temporarily removing the shavings from the cutter edges can lead to guidance and alignment problems when the shavings are allowed to accumulate and compact in front of the tool during use.

SUMMARY OF THE INVENTION

It is therefore an object of the invention to overcome the problems experienced with the prior art.

Another object of this invention is to provide a simple plunge cutting device and method.

Still another object of this invention is to provide a universal plunge cutting device and method for removal of pipes, pipe couplings, hubs from pipe joints, and flanged or planar members attached to plastic piping.

A plunge cutting device according to one form of the present invention includes a cylindrical body having an end wall and a cylindrical wall joined to the end wall. One or more slots are formed in a front face of the cylindrical wall. Each slot has a leading wall and a trailing wall. One or more reliefs are formed in the front face, each relief adjoining the leading wall of one of the slots. A cutter is disposed in each slot, and a pilot is provided for guiding the cylindrical body relative to a tubular pipe portion, the pilot being dimensioned to journal within the tubular pipe portion and being coaxially connected to the cylindrical body. A drive coupling member is provided for coupling the cylindrical body to a source of rotational energy to cause the cylindrical body to rotate about its axis relative to the exposed pipe portion.

A plunge cutting device according to another form of the present invention includes a cylindrical body having an end wall and a cylindrical wall joined to the end wall. One or more slots are formed in a front face of the cylindrical wall. A cutter is disposed in each slot, and a pilot is coaxially connected to the cylindrical body for guiding the cylindrical body relative to a tubular pipe portion. The pilot comprises a main pilot secured to the cylindrical body and an auxiliary pilot detachably mounted on the main pilot. A drive coupling member is provided for coupling the cylindrical body to a source of rotational energy to cause the cylindrical body to rotate about its axis relative to the exposed pipe portion.

This invention provides a simple, expedient and inexpensive means to assist in one of the more troublesome activities confronted by a plumber, which is the controlled removal of a flush mounted pipe coupling structure without the need for sawing, chiseling, and the like which normally must be done manually.

The invention should become clear to the person having ordinary skill in the art upon review of the drawings and the following detailed description thereof.

DETAILED DESCRIPTION OF THE ILLUSTRATED EMBODIMENTS

The Plunge cutting device:

FIGS. 1-4 illustrate a three-slot, three-cutter embodiment of the present invention. The three largest constituents of the plunge cutting device are a cylindrical body 10, a pilot 20, and a drive coupling shaft 26.

Figure 1:
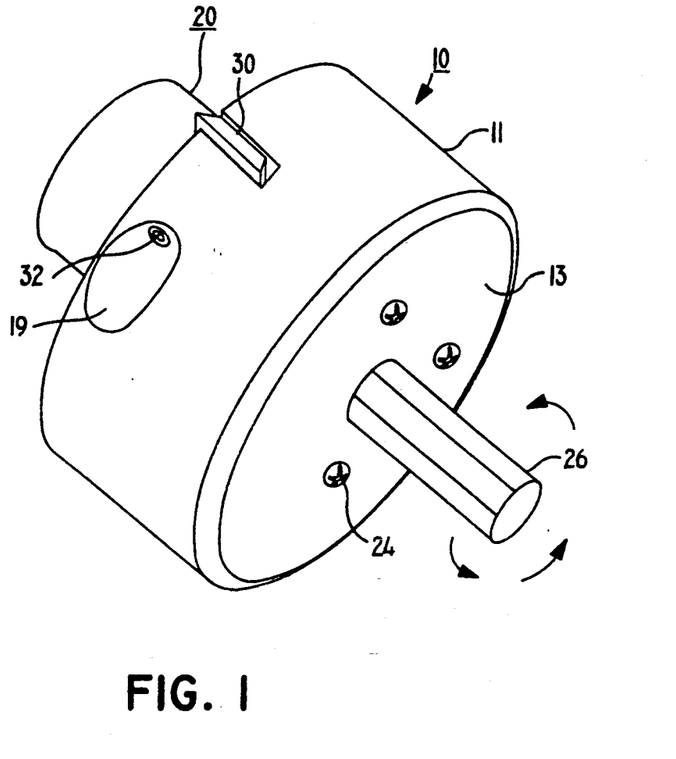
FIG. 1 is a perspective view of an embodiment of a plunge cutting device with three cutters in accordance with this invention.
Figure 3:
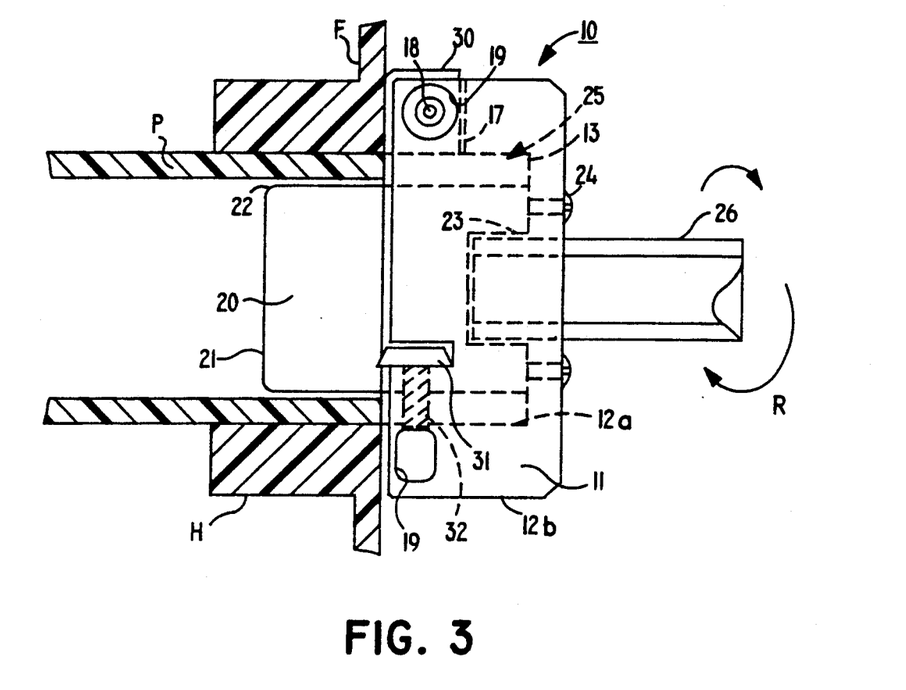
FIG. 3 is a partially cross-sectional side view of the plunge cutting device of FIG. 1 as it would appear during the removal of a closet flange from a pipe.

The pilot 20 serves as a mandrel for guiding the plunge cutting device during cutting operations. The pilot 20 can be made of any durable material and has the form of a cylindrical mass. For cutting plastic pipes, examples of suitable materials for the pilot 20 are steel, hard plastic, and aluminum, such as 6061-T6 aluminum. It has a front surface 21 with a slight bevel 22 on its periphery to facilitate insertion of the pilot 20 into a pipe or other tubular member. The pilot 20 is preferably solid and has an axial bore 23 for receiving the shaft 26 and a plurality of radially disposed, equidistantly spaced, threaded screw holes (not illustrated) axially recessed in the back face of the pilot 20.

The drive shaft 26 is adapted for connection to a power drill or the like to rotate the plunge cutting device about its axis. The shaft 26, composed of hardened steel or the like, is shaped by forging or machining, for example, to be rigidly secured to the pilot 20 by suitable means and extend from the back wall of the pilot 20 In the present embodiment, it is press fit into the bore 23 of the pilot 20, and may be further secured to the pilot 20 by means of a roll pin or the like. The exposed portion of the shaft 26 preferably possesses a polygonal cross section to facilitate secure attachment to the source of rotational force, such as a drill. Preferably, the shaft 26 can be readily detached from the pilot 20 to enable the shaft 26 to be easily replaced in the event that it becomes damaged during use.

Figure 4:
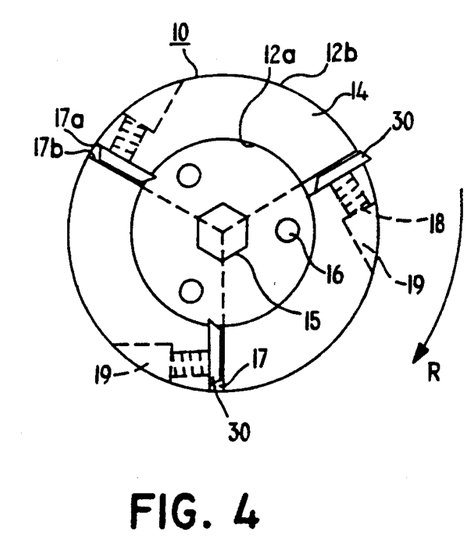
FIG. 4 is a front view of the plunge cutting device of FIG. 1 with the pilot and drive shaft removed.

The cylindrical body 10 is defined by a cylindrical wall 11 connected at one end to an end wall 13. The cylindrical wall 11 has a concentric cylindrical inner surface 12a and cylindrical outer surface 12b. The end wall 13 includes a plurality of screw holes 16 disposed about the center of the end wall 13, and a shaft hole 15 formed at the center of the end wall 13. The shaft hole 15 is dimensioned to accommodate the diameter or thickness of the shaft 26. If the shaft 26 has a polygonal cross section, preferably the shaft hole 15 has a corresponding shape to make it easier to align the screw holes in the back face of the pilot 20 with the screw holes 16 in the end wall 13. The pilot 20 is detachably mounted on the cylindrical body 10 with screws 24 which pass through the screw holes 16 in the cylindrical body 10 and screw into the corresponding threaded screw holes in the back face of the pilot 20 to position the pilot 20 coaxially with the cylindrical body 10. Means other than the screws 24 can be used to connect the pilot 20 to the cylindrical body 10.

When the pilot 20 and the cylindrical body 10 are secured to one another, they form an annular cavity 25 which has a width, i.e., the radial distance between the outer periphery of the pilot 20 and the inner surface 12a of the cylindrical body 10 selected to be slightly larger than the wall thickness of a pipe which is to be processed with the plunge cutting device. The axial length of the annular cavity 25 is sufficiently great to permit complete plunge cutting any member coupled to the pipe. If the pipe wall is of greater or lesser thickness than the norm, it is a simple matter to change the width of the annular cavity 25 by substituting a pilot 20 of different dimensions. Indeed, if the pipe member is not cylindrical, e.g. square, the pilot 20 can possess a cross-sectional configuration corresponding to the pipe, and will permit plunge cutting of the pipe, albeit with the result of a rounded outer surface.

Figure 5:
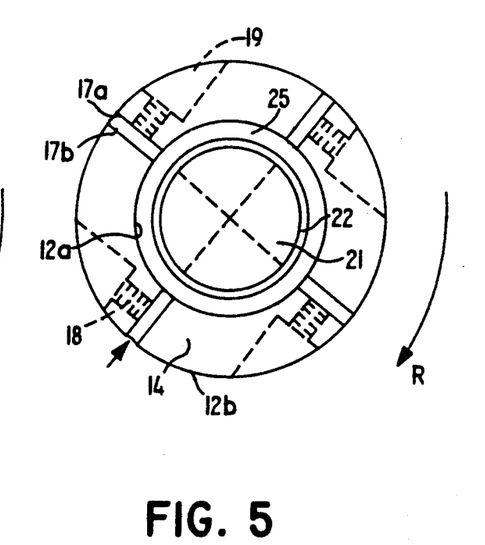
FIG. 5 is a front view of another embodiment of a plunge cutting device according to the present invention equipped with four cutter slots.

In accordance with an aspect of this invention, the cylindrical body 10 has means for supporting cutters 30 at a plurality of locations on the cylindrical body 10, herein shown as slots 17 disposed equidistantly about its front face 14. In FIGS. 1-4, the cylindrical body 10 is illustrated with three such slots 17 spaced 120° apart while FIG. 5 illustrates a cylindrical body with four slots 17 spaced 90° apart. However, the number of slots 17 formed in the cylindrical body 10 and their spacing around the circumference of the cylindrical body 10 are not critical. In principle, it is possible for there to be a single slot 17 in the cylindrical body 10, a plurality of slots 17 is preferred.

For ease of manufacture and simplicity of use, it is preferred to provide slots 17 of constant width and depth, each slot defined (see FIGS. 4 and 5) by a leading wall 17a and a trailing wall 17b to support cutters 30 of a preferred square shape, which thereby present cutting edges extending ahead of the front face 14 of the cylindrical body 10. In FIG. 4, alternate cutters 30 extend inwardly and outwardly, respectively, of the inner surface 12a and the outer surface 12b of the cylindrical body 10 to cut cleanly through and thereby fully remove a hub H and a flange F (if present) from the end of a pipe P. Leading and trailing refer to the orientation of the walls relative to the direction of rotation R of the plunge cutting device, i.e., the leading wall 17a leads and the trailing wall 17b follows as the cylindrical body 10 is rotated.

The slots 17 are preferably located so that the cutters 30 mounted therein present forwardly facing cutting edges that are skewed relative to a radius for the purpose of causing the shavings generated at the front face during cutting to be ejected radially outwardly. For example, in the embodiment of FIG. 4, the trailing wall 17b of each slot 17 lies along a radius of the cylindrical body 10, and each leading wall 17a is parallel to the trailing wall 17b so as to be skewed with respect to a radius of the cylindrical body 10. With this arrangement, the radial inner end of each leading wall 17a leads the radial outer end of the same leading wall 17a as the cylindrical body 10 is rotated, and this causes the cutting edge of a cutter 30 to function much as a snowplow to force cuttings radially outward from the cylindrical body 10. However, it is not necessary for the trailing wall 17b to lie along a radius, and both walls 17a and 17b could be skewed with respect to radii of the cylindrical body 10. Although it is generally easier to form the slots 17 if the leading and trailing walls of each slot are parallel, it is possible for them to be angled with respect to each other.

The slots 17 are illustrated extending axially relative to the cylindrical body 10. However, without departing from this invention, it may be desired to tilt the slots 17 axially and thereby angle the openings along the inner and outer surfaces 12a and 12b of the cylindrical body 10 but still maintain the leading wall 17a skewed with respect to a radius along the front face 14.

Preferably, the cutters 30 are adjustably mounted in the slots 17. Any suitable arrangement can be used to secure the cutters 30 in desired positions in the slots 17. In the illustrated embodiment, each of the slots 17 is associated with a counterbore 19 and a threaded set screw hole 18. Each set screw hole 18 extends perpendicularly through the cylindrical body 10 to open into its associated leading wall 17a. The counterbores 19 provide recesses in the outer surface 12b for access to the set screw holes 18 and to protect set screws 32 from damage during use. In this manner, set screw holes 18 and associated set screws 32 are nested within the cylindrical body 10. Preferably, the set screws 32 are conventional allen-type screws which can be manipulated with an allen-type wrench.

Figure 2:
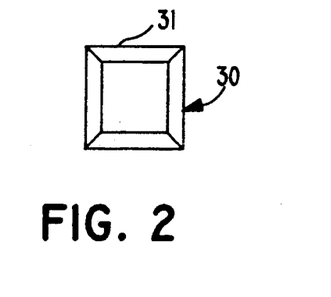
FIG. 2 is a plan view of one of the cutters of the embodiment of FIG. 1.

The slots 17 are dimensioned to seat the cutters 30. In this embodiment, the cutters 30 are preferably square cutting blades of hardened carbide steel, silicon carbide, ceramic or similar material with cutting edges on four sides. The cutters 30 preferably have bevels 31 on one surface, which angle toward the trailing surface of the cutters 30 when seated in the slots 17. The cutters 30 preferably have a width that is greater than the depth of the slots 17 so that when seated in the slot 17 where the rearward edge abuts and is secured axially by the bottom of the slot 17, the front edge of the cutter 30 projects from the front face 14 of the cylindrical body 10.

The cutters 30 are positionally adjustable and secured within the slots 17 by tightening the allen-type set screws 32 in the threaded set screw holes 18. Preferably, the counterbore 19 and the set screws holes 18 are positioned so that the set screws 32 frictionally engage and secure the cutters 30 on their leading surface. In other words, the screws 32 compress against the unbeveled surface of the cutters 30 which lie against the leading walls 17a of the slots 17. The cutters 30 are laterally positionable in the slots 17 meaning that the cutters 30 may project from the outer surface 12b (see FIG. 1) or the inner surface 12a of the cylindrical body 10. As explained below, by loosening a set screw 32, a cutter 30 may be translated in a slot 17 for precise positioning for plunge cutting.

Operation of the Plunge cutting device:

For the purpose of this discussion, reference is made to FIG. 3. FIG. 3 depicts a pipe P having attached thereto on its outer surface a fitting, such as a closet flange, including a flange F (wall mounted) and an integral hub H. The hub H is joined to the outer periphery of the pipe P by a conventional method, such as by use of a bonding agent. The purpose of the plunge cutting operation is to remove the fitting from the pipe P with minimal damage to the pipe P, leaving the pipe P at substantially its original outer diameter. This can be accomplished by cutting off the hub H and possibly portions of the flange F. A pilot 20 of desired diameter and length is selected and attached to the end wall 13 of the cylindrical body 10 to center the pilot 20 relative to the cylindrical body 10 and establish an annular cavity 25 of appropriate dimensions to journal the pipe P during cutting operations. The outer diameter of the pilot 20 is preferably slightly smaller than the inner diameter of the pipe P so that the pilot 20 can freely rotate inside the pipe P but with the amount of play between the pilot 20 and the pipe P being small enough that the pilot 20 can accurately guide the cylindrical body 10 during cutting operations.

The user of the device positions and secures the cutters 30 in the slots 17 and attaches the device via shaft 26 to a rotary power device, such as a drill (not illustrated). The user then slides the pilot 20 into the opening of the pipe P and initiates rotation of the device. The plunge cutting device is pressed toward the pipe opening to initiate cutting by the cutters 3 of the portions of the fitting which are to be removed, which in this case is at least the hub H and possibly portions of the flange F. As cutting progresses, the hub H is cut off from the pipe P and severed from the flange F, and at the same time the outer periphery of the pipe P may be slightly cut or shaved. The cuttings/shavings/filings from the pipe fitting are ejected outwardly and radially from the cutters 30. By providing for expulsion of the cutting debris, forward progress during plunge cutting and the cutting edges of the cutters 30 are not impeded due to buildup of the cuttings/shavings filings. Prevention of build-up results from the leading edges of the cutters 30 lying skewed from a radius of the cylindrical body 10. Thus, during rotation, material on the leading edges of the cutters 30 is urged radially outwards toward and beyond the outer surface 12b of the cylindrical body 10. Accordingly, the cuttings/shavings/filings spiral outwardly and away from the plunge cutting device. By so clearing the cuttings, the torque requirements to remove a fitting are reduced.

As cutting progresses, the end of the pipe P enters the annular cavity 25, and it may continue to enter until it reaches the end wall 13. The depth of the annular cavity 25 in the axial direction of the cylindrical body 10 is preferably chosen so that by the time the end of the pipe P contacts the end wall 13, the hub H will either have been completely cut off or sufficiently removed by the cutting process that the remaining portions can be removed by hand. A new coupling, extension, or the like can then be mounted onto the conditioned street end of the pipe P.

It is important to proper practice of this invention that the cutters 30 be properly positioned in the slots 17. When a plurality of cutters 30 are present, the user may select certain of the cutters 30 to protrude from the inner surface 12a and others from the outer surface 12b of the cylindrical body 10. The amount of protrusion of the cutters 30 can be selected such that any pipe joint adhesive and a selected amount of the outer wall of the pipe P will be removed, thus reducing the diameter of the pipe P and eliminating residual, old adhesive. The amount of material removed from the outer surface of the pipe P corresponds to the degree the cutters 30 protrude from the inner surface 12a of the cylindrical body 10. Furthermore, the inwardly protruding cutters 30 will remove the inner portion of hub H to a selected degree to condition the street end of the pipe P and the hub H to permit a new pipe or the like to be inserted therein and secured with pipe adhesive.

In order for the pipe P to be able to enter into the annular cavity 25 during the cutting operation of FIG. 3, it is necessary for the front face 14 of the cylindrical body 10 to actually pass through the flange F. Therefore, in the application illustrated in FIG. 3, the forward cutting edge (the cutting edge facing the fitting) of at least one of the cutters 30 preferably extends to at least the inner surface 12a of the cylindrical wall 11 and more preferably slightly radially inwards of the inner surface 12a, and the forward cutting edge of at least one of the cutters 30 preferably extends to at least the outer surface 12b and more preferably slightly radially outwards of the outer surface 12b so that cutting will take place over the entire radial thickness of the front face 14 from the inner surface 12a to the outer surface 12b.

In FIG. 4, all of the cutters 30 have the same dimensions, and therefore the forward cutting edge of each cutter 30 protrudes from the front face 14 of the cylindrical body 10. However, it is also possible for different ones of the cutters 30 to have different dimensions, and it is not necessary that all of the cutters 30 protrude from the front face 14.

The pilot 20 is of selected diameter and is easily substituted for a pilot of different diameters/dimensions by unscrewing the screws 24, substituting a different pilot 20, aligning the screw holes in the pilot 20 with the screw holes 16 in the cylindrical body 10, and re-securing the new pilot 20 with the screws 24. In this manner, it is relatively simple to adjust the width of the annular cavity 25 formed between the cylindrical body 10 and the pilot 20 in order to accommodate different pipe thicknesses and configurations. This convertibility feature reduces the number of plunge cutting devices required to service a full range of pipe sizes.

Furthermore, the axial length of the pilot 20 is variable. If the plunge cutting device is employed for cutting elbows and the like where the length of a straight portion behind a street end or shoulder is short, a shorter pilot 20 can be selected to accommodate such shorter length and still permit plunge cutting.

The cutters 30, as noted above, preferably possess four different cutting surfaces. During use the cutting edges tend to dull. Thus in order to provide a new cutting edge, the user need only to loosen the set screw 32, slide the cutter 30 from its slot 17, rotate the cutter to provide an unused edge, reset the cutter 30 in the desired position in the corresponding slot 17, and tighten the set screw 32. When all four edges of a cutter 30 have been used, it can be replaced with a new cutter.

However, during the operation of the embodiment in the manner shown in FIG. 3, only one cutting edge of each cutter 30 is performing cutting at a given time. Therefore, cutters having less than four cutting edges and even a single cutting edge can also be used in the present invention.

FIGS. 6–10 illustrate another embodiment of the present invention. In these figures, a six-slotted plunge cutting device is illustrated with canted reliefs 14a formed in the front surface 14 of the cylindrical body 10 and extending in front of and adjoining the leading wall 17a of each slot 17. Here, the term "canted" means that each relief 14a defines a declining surface extending from the inner surface 12a to the outer surface 12b of the cylindrical wall 11. The reliefs 14a are provided to facilitate ejection of cut shavings away from the cutting edges of the cutters 30. Thus, the reliefs 14a assist to prevent binding during plunge cutting operations. Similar reliefs 14a can also be employed in the embodiment of FIGS. 1–5. There is no particular limit on the slope of the canted reliefs 14a with respect to the front face 14a, but the larger the angle, the more effectively can shavings be ejected.

In the embodiment of FIGS. 1–5, the pilot 20 comprises a single cylindrical member having a substantially constant outer diameter over its entire length. In the embodiment of FIGS. 6–10, the plunge cutting device is equipped with a two-piece pilot, i.e., a main pilot 40 which is detachably and coaxially mounted on the cylindrical body 10 and an auxiliary pilot 50 which is detachably and coaxially mounted on the main pilot 40. Preferably, the main pilot 40 includes a cylindrical portion which can be used to guide the plunge cutting device when the auxiliary pilot 50 has been removed.

Figure 8:
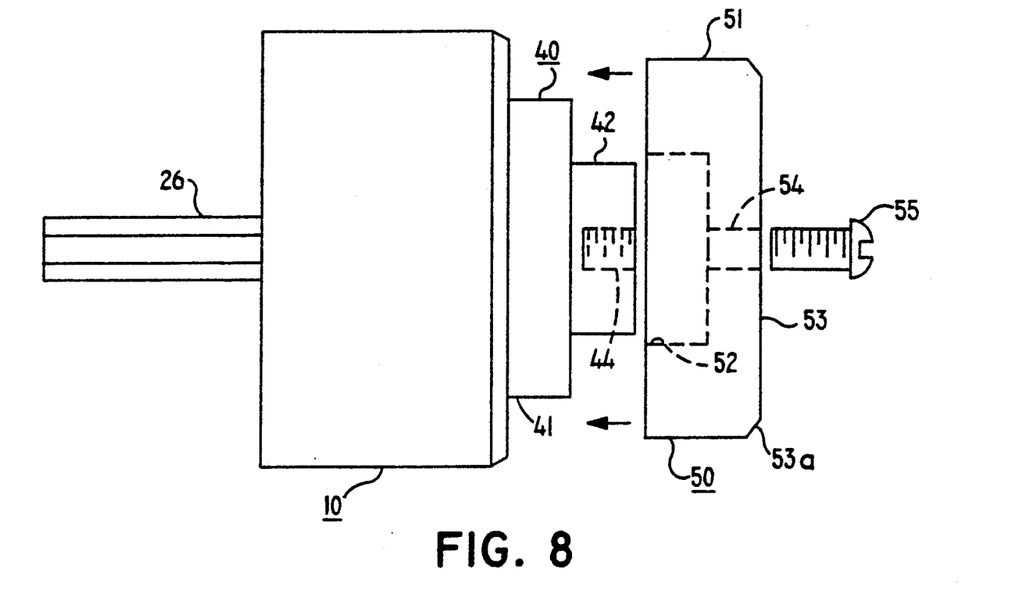
FIG. 8 is a side view representing the installation of an auxiliary pilot on the embodiment of FIG. 6.
Figure 9:
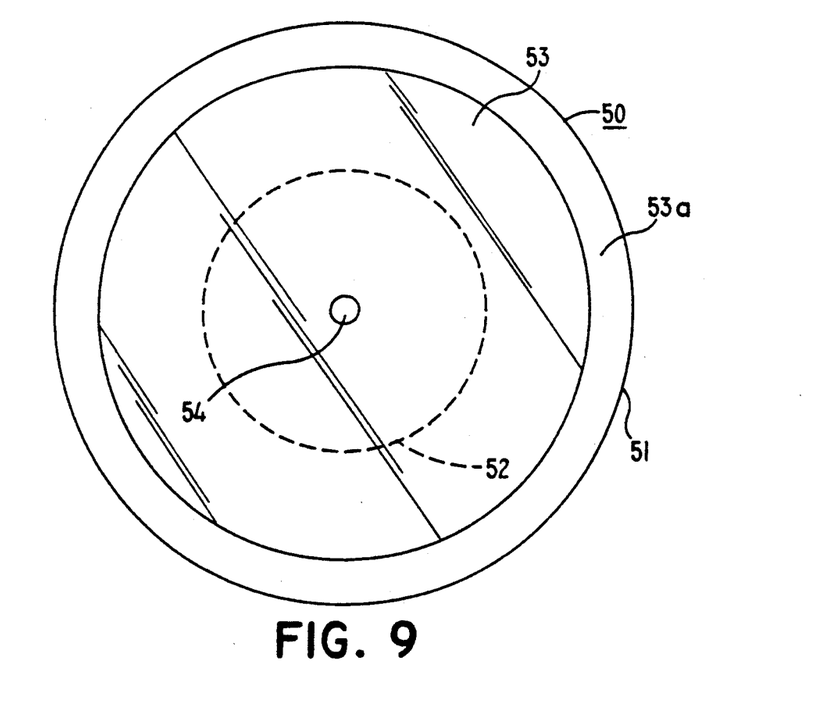
FIG. 9 is a front view of the auxiliary pilot shown in FIG. 8.

The main pilot 40 and the auxiliary pilot 50 can be joined together by any suitable means which permits the auxiliary pilot 50 to be easily detached and replaced with one of a different size. In the illustrated embodiment, the main pilot 40 has a stepped configuration and includes a first cylindrical portion 41 and a second cylindrical portion 42 coaxially disposed atop a step formed between the two cylindrical portions 41 and 42. The first cylindrical portion 41 has a larger diameter than the second cylindrical portion 42. For ease of manufacture, the two portions 41 and 42 may be integrally formed. The main pilot 40 can be rigidly secured to the cylindrical body 10 and the shaft 26 (omitted from FIG. 7) by the same means used to secure the pilot 20 in the first embodiment. As shown in FIG. 8, the main pilot 40 is designed to detachably support an interchangeable auxiliary pilot 50 atop the second cylindrical portion 42. The auxiliary pilot 50 performs the same function as the pilot 20 of the embodiment of FIG. 1 and guides the plunge cutting device during a cutting operation. In this embodiment, the auxiliary pilot 50 has a cylindrical outer surface 51 and a cylindrical bore 52 formed at its center which is slightly larger in diameter than the second cylindrical portion 42 of the main pilot 40 so that the second cylindrical portion 42 can slide easily into the bore 52 and thereby support the auxiliary pilot 50. The second cylindrical portion 42 has an end surface 43 at the center of which is formed a threaded screw hole 44, and the auxiliary pilot 50 has an end surface 53 through which a hole 54 is formed for receiving a screw 55. When the second cylindrical portion 42 is inserted into the bore 52 of the auxiliary pilot 50, the hole 54 in the auxiliary pilot 50 can be aligned with the screw hole 44 in the second cylindrical portion 42. The auxiliary pilot 50 is coaxially secured to the second cylindrical portion 42 by screwing the screw 55 into the screw hole 44 through hole 54.

In this embodiment, the auxiliary pilot 50 is rigidly secured to the main pilot 40 by the screw 55 so that there is no relative rotation between the two during plunge cutting. However, many other means can be used to connect the main pilot 40 and the auxiliary pilot 50. For example, in order to better prevent rotation between the two members, the second cylindrical portion 42 of the main pilot 40 and the bore 52 in the auxiliary pilot 50 could be formed with engaging portions, such as corresponding flats, or the screw 55 could be replaced by a pin passing radially through the second cylindrical portion 42 and the auxiliary pilot 50. Alternatively, the second cylindrical portion 42 could be replaced with a portion having a polygonal cross section, and the bore 52 could be formed with a corresponding shape. On the other hand, it is also possible for the auxiliary pilot 50 to be rotatably mounted on the main pilot 40. Thus, there are no particular restrictions on the method of connecting the auxiliary pilot 50 to the main pilot 40.

The end surface 53 of the auxiliary pilot 50 may be formed with a slight bevel 53a along its periphery to make it easier to insert the auxiliary pilot 50 into a pipe or other tubular member.

The outer diameter of the auxiliary pilot 50 can be selected in accordance with the inner diameter of the pipe or fitting with which the plunge cutting device is to be used. For example, when the purpose of the auxiliary pilot 50 is merely to increase the length of the main pilot 40, the auxiliary pilot 50 can have the same outer diameter as the first cylindrical portion 41 of the main pilot 40. Alternatively, the outer diameter of the auxiliary pilot 50 can be larger than that of the first cylindrical portion 41, as shown in FIG. 8.

A single main pilot 40 can be used with a plurality of auxiliary pilots 50 of different lengths and diameters. Since an auxiliary pilot 50 will generally be less expensive to manufacture and easier to install than a single-piece pilot like pilot 20 of the embodiment of FIG. 1, it is advantageous to use a plunge cutting device having a single main pilot 40 and a plurality of different interchangeable auxiliary pilots 50 rather than to manufacture the same number of single-piece pilots 20.

Figure 6:
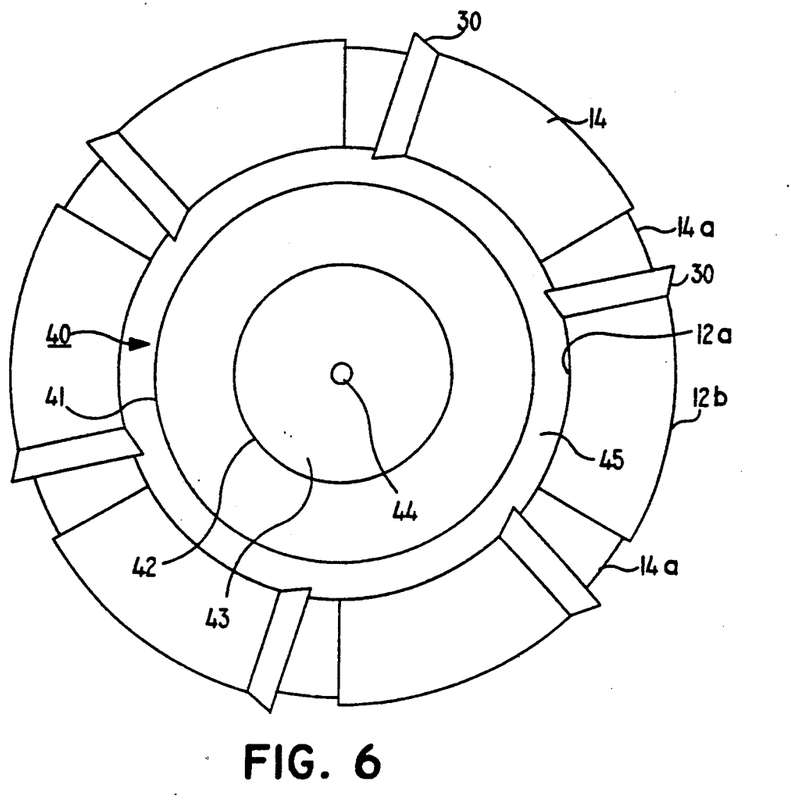
FIG. 6 is a front view of another embodiment of a plunge cutting device in accordance with this invention in a partially assembled state.
Figure 7:
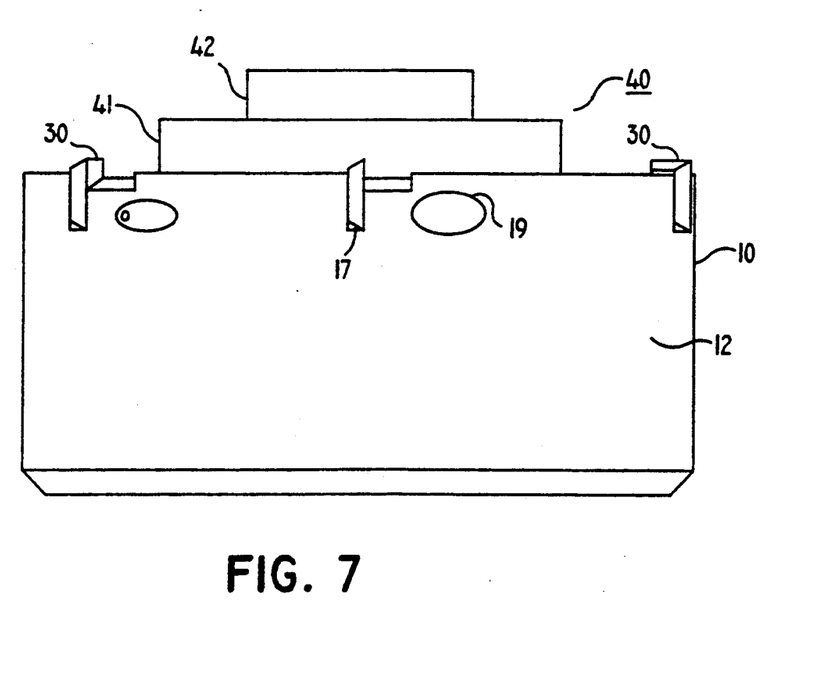
FIG. 7 is an elevation of the cylindrical body of the embodiment depicted in FIG. 6.

A cutting operation using the embodiment of FIG. 6 to remove a fitting from the outside of a pipe is performed in substantially the same manner as described above with respect to FIGS. 1-4, so an explanation of the operation will be omitted.

The main pilot 40 can be used either with or without an auxiliary pilot 50. For example, when the embodiment of FIG. 6 is used to remove a length of pipe from an elbow joint, in the initial stages of cutting, an auxiliary pilot 50 can be installed on the main pilot 40. As the cutting operation proceeds, the auxiliary pilot 50 will enter into the elbow joint. After it has entered the elbow joint by a certain distance, the curved inner walls of the elbow joint will prevent further forward movement of the auxiliary pilot 50. At this point, the plunge cutting device is withdrawn from the elbow joint, the auxiliary pilot 50 is detached from the main pilot 40, and the cutting operation can proceed using only the main pilot 40. Since the second cylindrical portion 42 of the main pilot 40 has a smaller outer diameter than the auxiliary pilot 50, the plunge cutting device can be inserted further into the elbow joint than was possible with the auxiliary pilot 50. With the auxiliary pilot 50 removed, the first cylindrical portion 41 of the main pilot 40 functions as a mandrel to guide the plunge cutting device. At this time, the second cylindrical portion 42 need not contact the inner surface of the elbow joint. Therefore, even if this portion is not completely cylindrical, e.g., if it has flats formed on it, it will not damage the inside of the elbow joint.

Figure 10:
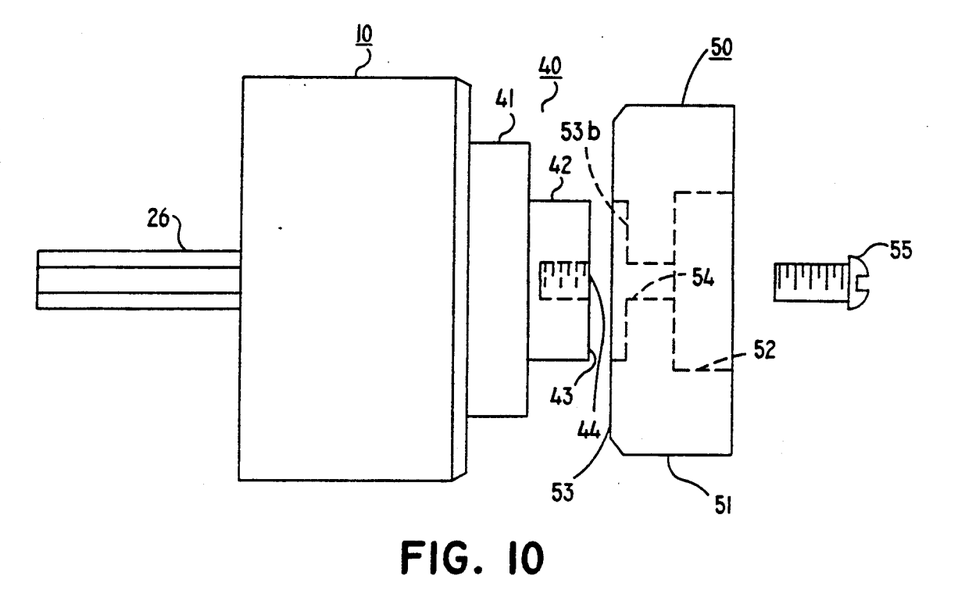
FIG. 10 is an exploded view illustrating another method of assembling the embodiment of FIG. 8.

FIG. 10 illustrates another method of attaching the auxiliary pilot 50 to the main pilot 40. In this method, the orientation of the auxiliary pilot 50 is reversed from that shown in FIG. 8 so that the end surface 53 of the auxiliary pilot 50 abuts against the end surface 43 of the second cylindrical portion 42 of the main pilot 40. The auxiliary pilot 50 is then secured to the main pilot 40 by suitable means, such as by screwing a screw 55 into the screw hole 44 in the main pilot 40. With this arrangement, the overall length of the main pilot 40 and the auxiliary pilot 50 is greater than with the arrangement shown in FIG. 8, permitting the auxiliary pilot 50 to extend farther into a pipe or other member during a cutting operation. A counterbore 53b having a shallow depth (such as 1/16 of an inch) and a diameter slightly larger than the second cylindrical portion 42 can be formed in the end surface 53 of the auxiliary pilot 50 surrounding the hole 54. When the auxiliary pilot 50 is installed as shown in FIG. 10, the counterbore 53b fits over the end surface 43 of the second cylindrical portion 42 to enable the second cylindrical portion 42 to more stably support the auxiliary pilot 50.

It is not necessary for the main pilot 40 to have a stepped configuration. For example, it could be a cylindrical member having a constant diameter selected so as to fit into the auxiliary pilot 50.

Figure 11:
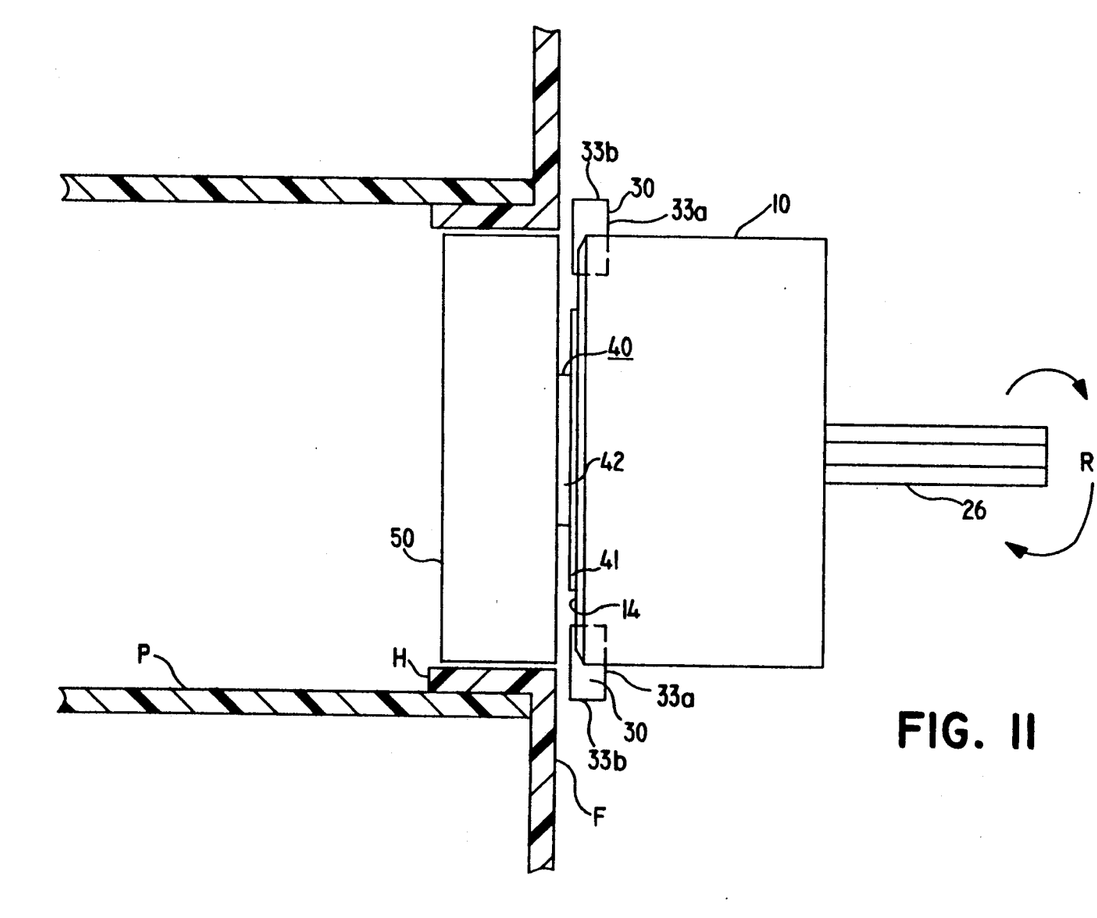
FIG. 11 is a partially cross-sectional side view of the embodiment of FIG. 6 as it would appear during use.

FIG. 11 is a partially cross-sectional side view illustrating how this embodiment of a plunge cutting device can be used to remove a fitting from the inside surface of a pipe. In this figure, a fitting, such as a closet flange, has a hub H which is secured to the inner periphery of a pipe P and a flange F which is integral with the hub H extends radially outwards from the hub H and abuts against the end surface of the pipe P. The auxiliary pilot 50 of this embodiment is selected to have an outer diameter slightly smaller than the inner diameter of the hub H of the fitting so that the auxiliary pilot 50 can be easily inserted into the hub H during plunge cutting. The cylindrical body 10 has an outer diameter which is preferably no greater than the inner diameter of the pipe P so that the cylindrical body 10 can be inserted into the pipe P during cutting. In the illustrated embodiment, the outer diameter of the cylindrical body 10 is substantially the same as that of the auxiliary pilot 50, but the outer diameter may be larger or smaller than that of the auxiliary pilot 50.

The cutters 30 supported by the cylindrical body 10 extend radially outwards from the cylindrical body 10 approximately to the inner periphery of the pipe P so as to be able to cut through the hub H of the fitting without cutting or only slightly cutting the pipe P. Although it is possible for the cutters 30 to be square in this application, in order for the cutter slots 17 in the cylindrical body 10 to adequately support the cutters 30 and still enable the cutters 30 to extend radially outwards from the cylindrical body 10 by a suitable amount, it may be preferable for the cutters 30 to be rectangular with two lengthwise sides 33a and two widthwise sides 33b shorter than the lengthwise sides 33a, as shown in FIG. 11.

To assist in installing the cutters 30 in the slots 17, before the auxiliary pilot 50 is mounted on the main pilot 40, an unillustrated cup-shaped plastic nipple having an inner diameter approximately equal to the outer diameter of the first cylindrical portion 41 can be temporarily disposed over the first cylindrical portion 41. The rectangular cutters 30 are then inserted into the slots 30 with one of the widthwise sides 33b of each cutter 30 abutting against the outer periphery of the nipple. When the cutters 30 are so disposed, each cutter 30 will extend radially outwards to approximately the inner periphery of the pipe P. The nipple is then removed from the main pilot 40, and the auxiliary pilot 50 is installed atop the main pilot 40 as shown in FIG. 11. In this manner, the cutters 30 can be quickly yet precisely installed in the slots 17 of the cylindrical body 10 without the need for careful measurements of the amounts by which they extend radially outwards.

Cutting edges are preferably formed along both of the lengthwise sides 33a of each cutter 30, so that if one of the cutting edges becomes dull, the cutter 30 can be reversed in its slot to present a sharp cutting edge. In order to prevent gouging of the inner surface of the pipe P, the widthwise sides 33b of the cutters 30 are preferably blunt. The lengthwise sides 33a of the cutters 30 facing the fitting are shown as extending from the front face 14 of the cylindrical body 10 However, if the cylindrical body 10 has an outer diameter which is less than or equal to the outer diameter of the auxiliary pilot 50, it is possible for these lengthwise sides 33a to be flush with or even recessed in the front face 14. For ease of illustration, the canted reliefs 14a, the counterbores 19, and the remaining cutters 30 and have been omitted from FIG. 11.

During the operation of the embodiment illustrated in FIG. 11, the cylindrical body 10 is rotated about the axis of the shaft 26 and urged axially into the pipe P as it is guided by the auxiliary pilot 50 disposed inside the hub H of the fitting. When the forward cutting edges of the cutters 30 (the leftmost edges of the cutters 30 in FIG. 11) contact the hub H, they cut through the hub H and sever it from the flange F, which can then be removed from the pipe P. Upon the cutters 30 entering into the pipe P, they then cut the hub H off the inner surface of the pipe P. By suitably adjusting the amount by which the cutters 30 extend radially outwards form the cylindrical body 10, the cutters 30 can completely remove the hub H for the pipe P without injuring the inner surface of the pipe P. The amount of extension of the cutters 30 in the radial direction can also be selected so that the cutters 30 lightly shave the inner surface of the pipe P and remove any old adhesive remaining on the inner surface. The pipe P is then ready for the installation of a new fitting.

What is claimed is:

1. A plunge cutting device comprising:
   a cylindrical body having an end wall, a cylindrical wall having a first end with an end face and a second end, the cylindrical wall being jointed to the end wall at the second end and having an inner cylindrical surface and an outer cylindrical surface, at least one slot being formed in the end face and extending axially from the first end of the cylindrical wall;
   at least one cutter disposed in each slot; and
   a pilot for guiding the cylindrical body relative to a tubular member, the pilot comprising a main pilot coaxially secured to the cylindrical body and having a cylindrical outer surface surrounded by and spaced from the inner cylindrical surface of the cylindrical body, and a one-piece auxiliary pilot detachably mounted on the main pilot had having a cylindrical outer surface coaxial with the inner cylindrical surface of the cylindrical body.

2. The plunge cutting device according to claim 1 wherein the main pilot comprises a first cylindrical portion coaxial with the inner cylindrical surface of the cylindrical body and a second portion secured to the first cylindrical portion an having a smaller cross section than the first cylindrical portion, and the auxiliary pilot is secured to the second portion of the main pilot.

3. The plunge cutting device according to claim 2 wherein the auxiliary pilot has an outer diameter at least equal to the first cylindrical portion of the main pilot.

4. The plunge cutting device according to claim 2 wherein the auxiliary pilot has a cavity shaped to fit over the second portion of the main pilot, and the auxiliary pilot can be secured to the second portion of ht main pilot with the cavity fitting over the second portion or facing away from the second portion.

5. The plunge cutting device according to claim 1 wherein the pilot includes a plurality of one-piece auxiliary pilots of different outer diameters, each of which can be detachably mounted on the main pilot.

6. The plunge cutting device according to claim 1 wherein the cutter is square.

7. The plunge cutting device according to claim 1 wherein the cutter is rectangular and has lengthwise side and widthwise sides shorter than the lengthwise sides.

8. The plunge cutting device according to claim 1 wherein each of the slots has a leading wall and at least one relief in the end face of the cylindrical wall outside of the slot, each relief adjoining the leading wall of a slot.

9. The plunge cutting device according to claim 8 wherein each relief is sloped with respect to the end face form the inner surface toward the outer surface of the cylindrical body.

10. The plunge cutting device according to claim 1 wherein the cutter protrudes from the end face of the cylindrical wall form the inner surface to the outer surface of the cylindrical wall.

11. The plunge cutting device according to claim 1 wherein the auxiliary pilot is mounted on and detached form the main pilot by movement of the auxiliary pilot i the axial direction of the main pilot.

12. The plunge cutting device according to claim 2 wherein the second cylindrical portion of the main pilot ha an outer end surface abutting against the auxiliary pilot.

13. The plunge cutting device according to claim 1 wherein the auxiliary pilot has an end surface further from the cylindrical body than the main pilot.

14. The plunge cutting device according to claim 1 wherein the auxiliary pilot extends completely around the main pilot.

15. A plunge cutting device comprising:
   a cylindrical body having an end wall, a cylindrical wall having a first end with an end face and a second end, the cylindrical wall being jointed to the end wall at the second end and having an inner cylindrical surface and an outer cylindrical surface, at least one slot formed in the end face and extending axially from the first end of the cylindrical wall, each slot having a leading wall and a trailing wall, and at least one relief in the end face outside of each slot, each relief adjoining the leading wall of a slot;

at least one cutter disposed in each slot; and a pilot for guiding the cylindrical body relative to a tubular member, the pilot being coaxially connected to the cylindrical body and spaced from the inner cylindrical surface of the cylindrical body.

16. A method for cutting a tubular member from an elbow joint using a plunge cutting device including a cylindrical body having an axis an a cylindrical wall, a plurality of cutters mounted in slots in the cylindrical wall, and a pilot coaxially mounted on the cylindrical body, the pilot including a main pilot having a cylindrical portion and an auxiliary pilot coaxially mounted on the main pilot and having a cylindrical outer surface, the method comprising:

inserting the auxiliary pilot into an end of the elbow joint with the cylindrical outer surface of the auxiliary pilot supported by an inner surface of the elbow joint;

rotating the cylindrical body about the axis while urging the cutters against the tubular member to cut into the tubular member to a first depth;

removing the auxiliary pilot from the end of the elbow joint upon reaching the first depth and detaching the auxiliary pilot from the main pilot;

inserting the main pilot into the end of the elbow joint with the cylindrical portion of the main pilot supported by the inner surface of the elbow joint; and rotating the cylindrical body about the axis while urging the cutters against the tubular member to cut into the tubular member to a second depth greater than the first depth.

* * * * *

UNITED STATES PATENT AND TRADEMARK OFFICE
CERTIFICATE OF CORRECTION

PATENT NO. : 5,314,270
DATED : May 24, 1994
INVENTOR(S) : Lavanchy et al.

It is certified that error appears in the above-indentified patent and that said Letters Patent is hereby corrected as shown below:

Title page, item [19] change "Lavancy et al" to --Lavanchy et al--; and item [76] Inventors: change "Lavancy" to --Lavanchy--.

In column 11, line 68, change "each slot" to --one of the slots--,

Column 12, line 14, change "an" to --and--, line 23, change "ht" to --the--,
line 34, change "side" to --sides--,
line 43, change "form" to --from--,
line 47, change "form" to--from--,
line 52, after "i" insert --n--,
line 55, after "ha" insert --s--, Column 12, line 66, change "jointed" to --joined--, Column 11, line 62, change "jointed" to --joined--, Column 13, line 16, change "axis an" to --axis and--.

Signed and Sealed this

Seventh Day of March, 1995

Attest:

BRUCE LEHMAN

Attesting Officer  Commissioner of Patents and Trademarks